March 8, 1927. 1,620,237
H. SCHRODER
STEERING DEVICE
Filed April 5, 1926
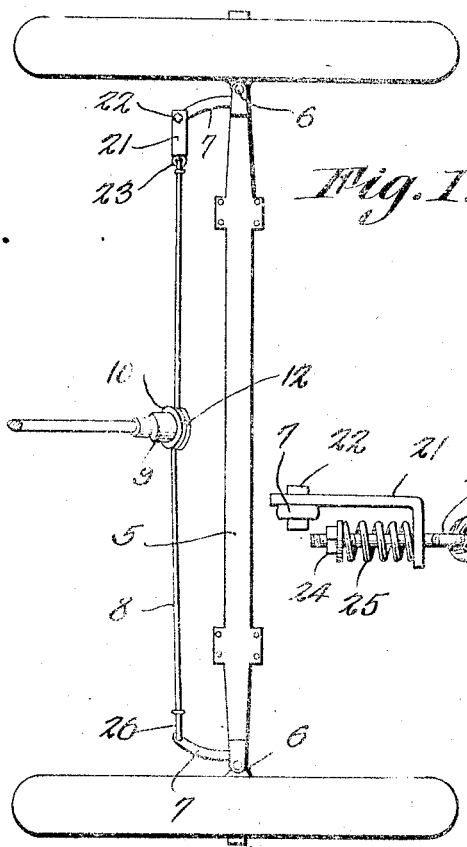
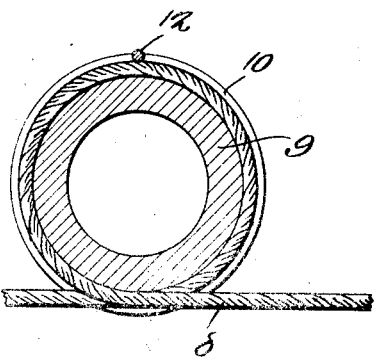
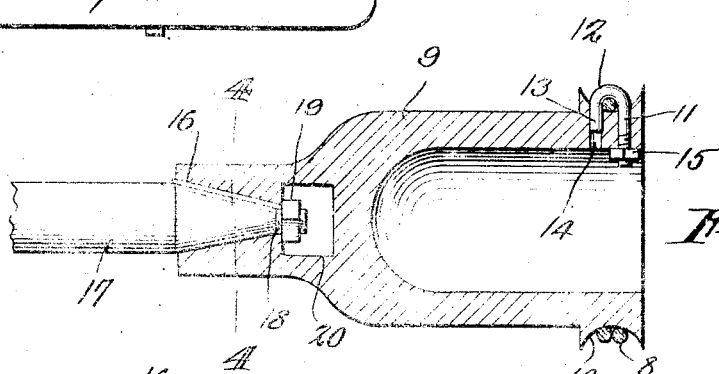
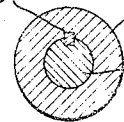
Herman Schroder
Inventor
By C.A. Snow & Co.
Attorneys Patented Mar. 8, 1927.

1,620,237

UNITED STATES PATENT OFFICE.

HERMAN SCHRODER, OF CAPRON, OKLAHOMA.

STEERING DEVICE.

Application filed April 5, 1926. Serial No. 99,929.

This invention has reference to a steering mechanism employed in connection with a well known type of motor vehicle for controlling the front or steering wheels of a motor vehicle to facilitate the steering operation.

An important object of the invention is to provide a device wherein lost motion between the spindle arms and steering column will be reduced to the minimum.

A further object of the invention is the provision of means whereby lost motion may be readily and easily taken up eliminating the necessity of rebushing the usual wheel spindles.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a steering mechanism constructed in accordance with the invention.

Figure 2 is a transverse sectional view through the steering head.

Figure 3 is a longitudinal sectional view through the steering head.

Figure 4 is a sectional view taken on line 4—4 of Figure 3.

Referring to the drawing in detail, the reference character 5 indicates the front axle of a vehicle on which the spindles 6 are pivotally mounted in the usual and well known manner.

The reference character 7 indicates the spindle arms that extend rearwardly from the spindles 6 and to which the connecting member 8 is secured, the connecting member 8 being in the form of a cable or similar flexible member.

The device includes a head 9 which is preferably hollow and provided with a pulley 10 at its outer or free end, which pulley permits the cable 8 to be wound on the head in such a way as to prevent the cable from slipping from the head while in use.

Passing through the head, and disposed adjacent to the pulley is a bolt 11 which is formed with a curved extremity 12 terminating in a downwardly extended portion 13 adapted to fit in the opening 14 formed in the head, the opposite end of the member 11 being threaded to accommodate the nut 15 for clamping the flexible member 8 in position.

Formed at the opposite end of the head is an opening which is formed with a lateral recessed portion providing a key-way for the reception of the key 16 carried at the lower end of the steering rod 17, the extremity 18 of the steering rod being threaded to accommodate the nut 19 which is passed through the opening 20 formed in the head for clamping the steering rod to the head to insure operation of the head when the rod 17 is moved.

From the foregoing it will be obvious that due to this construction, lost motion between the rod 17 and spindle arms 7 may be reduced to the minimum, and when lost motion occurs, it will be seen that such lost motion may be readily taken up by shortening the cable 8.

The connection between the cable 8 and spindle arms as shown by Figure 1 is such that a slight movement of the cable 8 independently of the spindle arm may take place upon the movement of the cable.

As shown, a substantially L-shaped supporting member 21 is shown at one end of the cable 8, which is supplied with a bolt 22 adapted to be passed through the opening in the outer end of the spindle arm 7 associated therewith. Passing through a suitable opening formed in the member 21 is an eye bolt 23 which is supplied with a nut 24 at its inner end, the nut acting as a stop against which one end of the coiled spring 25 engages, the opposite end of the coiled spring contacting with the L-shaped member 21, to the end that as the cable 8 is pulled, the spring 25 is tensioned relieving the connection between the cable and spindle arms 7 of undue strain caused by sudden jerking of the cable 8.

It will further be seen that due to this construction, slight movement of the wheels will be permitted independently of the cable 8 and steering rod, to the end that the steering rod will remain stationary while in the hands of the operator, except when moved by the operator.

At the opposite end of the cable 8 a loop 26 is formed in any well known manner the loop providing means for connecting the cable to the spindle arms associated therewith.

I claim:

In a device of the character described, a hollow head, said head having a socket formed at one end thereof, said socket being tapered to receive the tapered end of a steering rod, the wall of said socket and tapered end of said steering rod having aligning grooves, a key positioned in the aligning grooves, said steering rod having a threaded portion, said head having an opening disposed transversely therethrough, in which the threaded portion of the steering rod lies, a nut adapted to be positioned in the opening and positioned on the threaded portion of the rod, and said head having a pulley to accommodate a cable.

In testimony that I claim the foregoing as my own, I have hereto affixed my signature.

HERMAN SCHRODER.